United States Patent [19]

Mobini

[11] Patent Number: 5,715,176
[45] Date of Patent: Feb. 3, 1998

[54] METHOD AND SYSTEM FOR LOCATING A FRAME POSITION IN AN MPEG DATA STREAM

[75] Inventor: Amir Mansour Mobini, Deerfield Beach, Fla.

[73] Assignee: International Business Machines Corporation, Armonk, N.Y.

[21] Appl. No.: 590,264

[22] Filed: Jan. 23, 1996

[51] Int. Cl.$^6$ ...................................................... G06F 17/00
[52] U.S. Cl. .......................... 364/514 R; 386/75; 386/96; 386/112; 382/236; 348/715; 370/506; 370/516; 370/517
[58] Field of Search ................................. 348/423, 715, 348/396, 402, 416, 432, 51, 515, 518; 370/506, 395, 516–517, 503, 522; 360/64; 380/20; 386/112, 75, 96

[56] References Cited

U.S. PATENT DOCUMENTS

| | | | |
|---|---|---|---|
| 4,314,368 | 2/1982 | Decoursey et al. | 370/108 |
| 4,385,396 | 5/1983 | Norton . | |
| 4,716,578 | 12/1987 | Wight . | |
| 4,761,800 | 8/1988 | Lese et al. . | |
| 4,809,303 | 2/1989 | Barndt, Sr. . | |
| 5,008,902 | 4/1991 | Key et al. . | |
| 5,010,559 | 4/1991 | O'Connor et al. . | |
| 5,151,784 | 9/1992 | Lavagetto et al. | 348/416 |

(List continued on next page.)

FOREIGN PATENT DOCUMENTS

| | | | |
|---|---|---|---|
| 0407970A2 | 1/1991 | European Pat. Off. | H04N 5/93 |
| 0534620A2 | 3/1993 | European Pat. Off. | G11B 5/86 |
| 0622957A2 | 4/1993 | European Pat. Off. | H04N 5/92 |

OTHER PUBLICATIONS

Draft Amendment ISO/IEC 13818-1 title "Information Technology —Generic Coding of Moving Pictures and Associated Audio Information", (ISO Commitee draft), Part I, Amendment I–III, 95–96.

Draft Amendment ISO/IEC 13818-2 title "Information Technology —Generic Coding of Moving Pictures and Associated Audio Information" (ISO Commitee draft), Part II, Amendment I–IV ,1996.
ISO/IEC 11172-1 standard (for MPEG), 1993.
Pinciroli, et al., "A Peano–Hilbert Derived Algorithm for Compression of Angio–cardiographic Images" by IEEE, 1992.
Pinciroli, et al., "Effective Data Compression of Angio–cardiographic Static Images with PABCEL Method", by IEEE 1992.
Ciro Cafforio, et al., "Motion Compensated Image Interpolation", IEEE Trans. on Comm., vol.38 , No.2 Feb. 2, 1990.
Shu Lin, "An Introduction to Error–Correcting Codes", Prentic Hall, Inc., pp. 112–119, 1970.
Peterson et al. "Error–correcting Codes" 2nd. edition, The MIT Press, pp. 278–299, 1972.

*Primary Examiner*—Emanuel T. Voeltz
*Assistant Examiner*—Cuong H. Nguyen
*Attorney, Agent, or Firm*—Mark S. Walker; Andrew J. Dillon

[57] ABSTRACT

A method for locating a frame position in an MPEG data stream within a computer system is disclosed. MPEG standard is a set of defined algorithms and techniques for the compression and decompression of moving pictures (video) and sound (audio), and the formation of a multiplexed data stream that includes the compressed video and audio data plus any associated ancillary service data. Although the MPEG standard is extremely flexible, there is a fundamental deficiency associated with the packet-oriented nature of the MPEG format, and that is there being no information about the position of each video frame encoded in the data stream. Even though such information can be deduced from the byte-rate, but because the calculation of a frame position depends on a constant byte-rate, a problem may still arise when the byte-rate is non-existent, incorrectly encoded, or constantly changed due to the presence of several packs with varying rates. This invention presents an improved method for locating a frame position in the MPEG data streams regardless of the byte-rate condition.

18 Claims, 5 Drawing Sheets

U.S. PATENT DOCUMENTS

| | | | |
|---|---|---|---|
| 5,319,707 | 6/1994 | Wasilewski | 380/14 |
| 5,371,547 | 12/1994 | Siracusa et al. | 348/426 |
| 5,414,455 | 5/1995 | Hooper et al. | 348/7 |
| 5,442,390 | 8/1995 | Hooper et al. | 348/7 |
| 5,448,571 | 9/1995 | Hong et al. | |
| 5,488,570 | 1/1996 | Agarwal | 364/514 R |
| 5,508,942 | 4/1996 | Agarwal | 364/514 R |
| 5,511,003 | 4/1996 | Agarwal | 364/514 R |
| 5,515,296 | 5/1996 | Agarwal | 364/514 R |
| 5,583,864 | 12/1996 | Lightfoot et al. | 370/396 |
| 5,594,660 | 1/1997 | Sung et al. | 364/514 R |
| 5,596,420 | 1/1997 | Daum | 386/110 |
| 5,603,512 | 2/1997 | Sotheran | 395/500 |
| 5,608,448 | 3/1997 | Smoral et al. | 348/7 |
| 5,630,005 | 5/1997 | Ort | 386/69 |

METHOD AND SYSTEM FOR LOCATING A FRAME POSITION IN AN MPEG DATA STREAM

BACKGROUND OF THE INVENTION

1. Technical Field

The present invention relates to a method and system for data processing in general, and in particular to a method for processing MPEG data streams within a computer system. Still more particularly, the present invention relates to a method for locating a frame position in an MPEG data stream within a computer system.

2. Description of the Prior Art

In 1988, the Moving Picture Experts Group (MPEG) was established under the framework of the Joint ISO/IEC Technical Committee (JTC 1) on Information Technology with the mandate to develop standards for coded representation of moving pictures (video), associated sound (audio), and their combination when utilized for storage and retrieval on digital storage media (DSM). In April 1990, it became Working Group 11 (WG 11) of JTC 1/SC 2, and in November 1991 WG 11 of JTC 1/SC 29. The original work items of MPEG consist of coding up to 1.5, 10, and 40 Mb/s, which were respectively nicknamed as MPEG-1, -2, and -3.

In broad terms, the MPEG standard addresses the compression/decompression of video and audio data, and the formation of a multiplexed common data stream that includes the compressed video and audio data plus any associated ancillary service data. The MPEG standard also addresses the synchronization of video, audio and ancillary data during playback of the decompressed signals. It is intended to cater to a wide variety of applications and services, including but not limited to television broadcasting and communications.

Specifically, the MPEG standard is a set of algorithms for compression and systemization, and techniques with well-defined rules and guidelines. The rules and guidelines allow variation in the values assigned to many of the parameters, providing for a broad range of products and interoperability. The MPEG data stream comprises two layers—system layer and compression layer. The system layer contains timing and other information needed to de-multiplex the audio, video and ancillary data streams, and to provide synchronization during playback. The compression layer includes the compressed audio and video data streams.

Although the MPEG standard is extremely flexible, there is a fundamental deficiency associated with the packet-oriented nature of the MPEG format, and that is no information about the position (or byte offset) of each video frame being encoded in the data stream. Even though such information can be deduced from the byte-rate of the data stream, but because the calculation of a frame position depends on a constant byte-rate, a problem may still arise when the byte-rate is non-existent, incorrectly encoded, or constantly changed due to the presence of several packs having varying rates. Certainly, the frame position can also be obtained by parsing the data stream. This, however, could be quite time consuming because the parsing must be perform from the beginning of the data stream every time when such information is needed.

Consequently, it would be desirable to provide a method for efficiently locating a frame position in MPEG data streams within a computer system.

SUMMARY OF THE INVENTION

In view of the foregoing, it is therefore an object of the present invention to provide an improved method and system for data processing.

It is another object of the present invention to provide an improved method for processing MPEG data streams within a computer system.

It is yet another object of the present invention to provide an improved method for locating a frame position in an MPEG data stream within a computer system.

In accordance with the method and system of the present invention, a frame number for a desired frame in an MPEG data stream is first obtained from a user or some other input. A byte-rate of the MPEG data stream and a byte position of a selected frame are then determined analytically. Next, a presentation time stamp that is nearest to the determined byte position of the selected frame is compared with a time position of the desired frame. If the presentation time stamp is not within a specified proximity to the time position of the desired frame, the process returns to determine another byte-rate for the data stream. However, if the presentation time stamp is within the specified proximity of the time position of the desired frame, the desired frame is located by searching a presentation time stamp that is closest to the time position of the desired frame.

All objects, features and advantages of the present invention will become apparent in the following detailed written description.

BRIEF DESCRIPTION OF THE DRAWINGS

The invention itself, as well as a preferred mode of use, further objects and advantage thereof, will best be understood by reference to the following detailed description of an illustrative embodiment when read in conjunction with the accompanying drawings, wherein.

DETAILED DESCRIPTION OF PREFERRED EMBODIMENT

The present invention may be executed in a variety of computers under a number of different operating systems. The computer may be, for example, a personal computer, a mini-computer or a mainframe computer. In addition, the computer may be a stand-alone system or part of a network such as a local area network (LAN) or a wide area network (WAN). For the purpose of illustration, a preferred embodiment of the present invention, as described below, is implemented on a personal computer, such as the Aptiva™ series manufactured by International Business Machines Corporation.

Figure 1A:
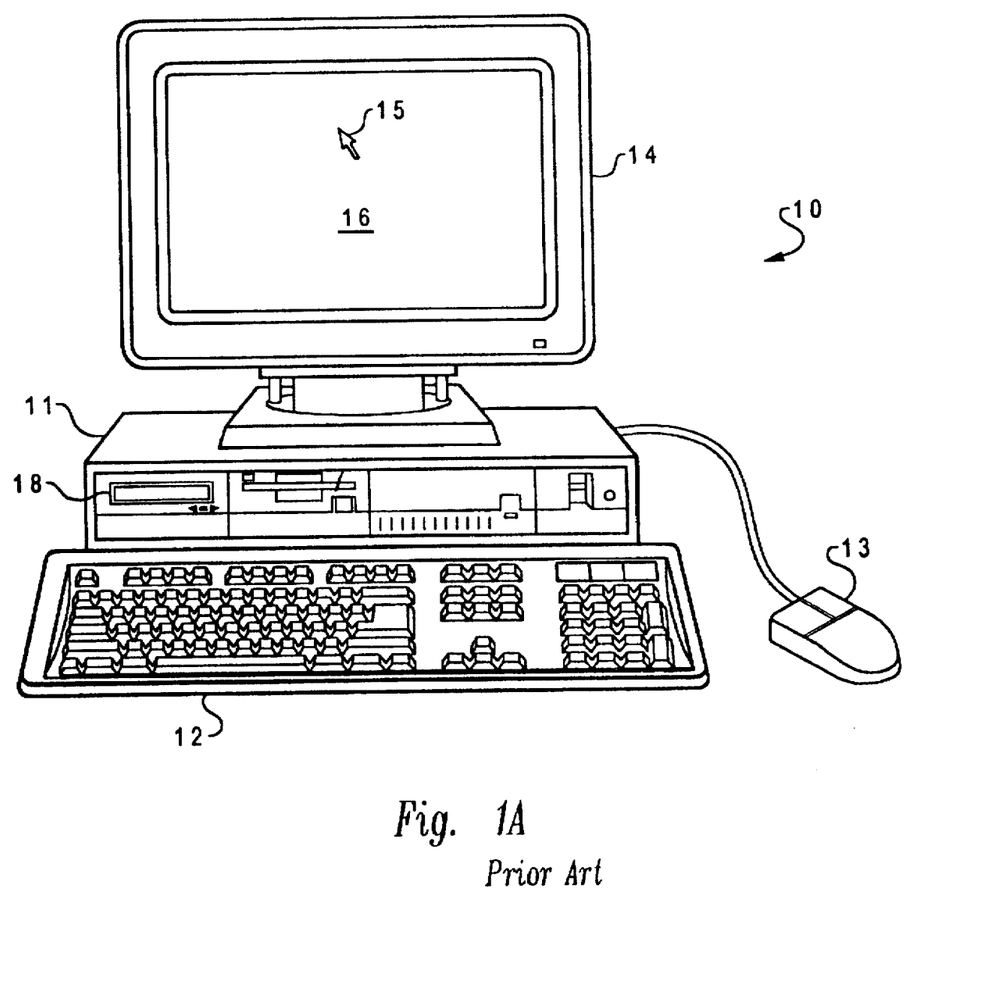
FIG. 1A is a pictorial diagram of a personal computer utilized by a preferred embodiment of the invention.

Referring now to the drawings and in particular to FIG. 1A, there is depicted a diagram of personal computer 10 which may be utilized by a preferred embodiment of the present invention. Personal computer 10 comprises processor unit 11, keyboard 12, mouse 13 and video display (or monitor) 14. Keyboard 12 and mouse 13 constitute user input devices, and video display 14 constitutes an output device. Mouse 13 is utilized to control cursor 15 displayed on screen 16 of video display 14. Personal computer 10 supports a Graphic User Interface (GUI) which allows a user to "point-and-shoot" by moving cursor 15 to an icon or specific location on screen 16 via mouse 13 and then press one of the buttons on mouse 13 to perform a user command.

Figure 1B:
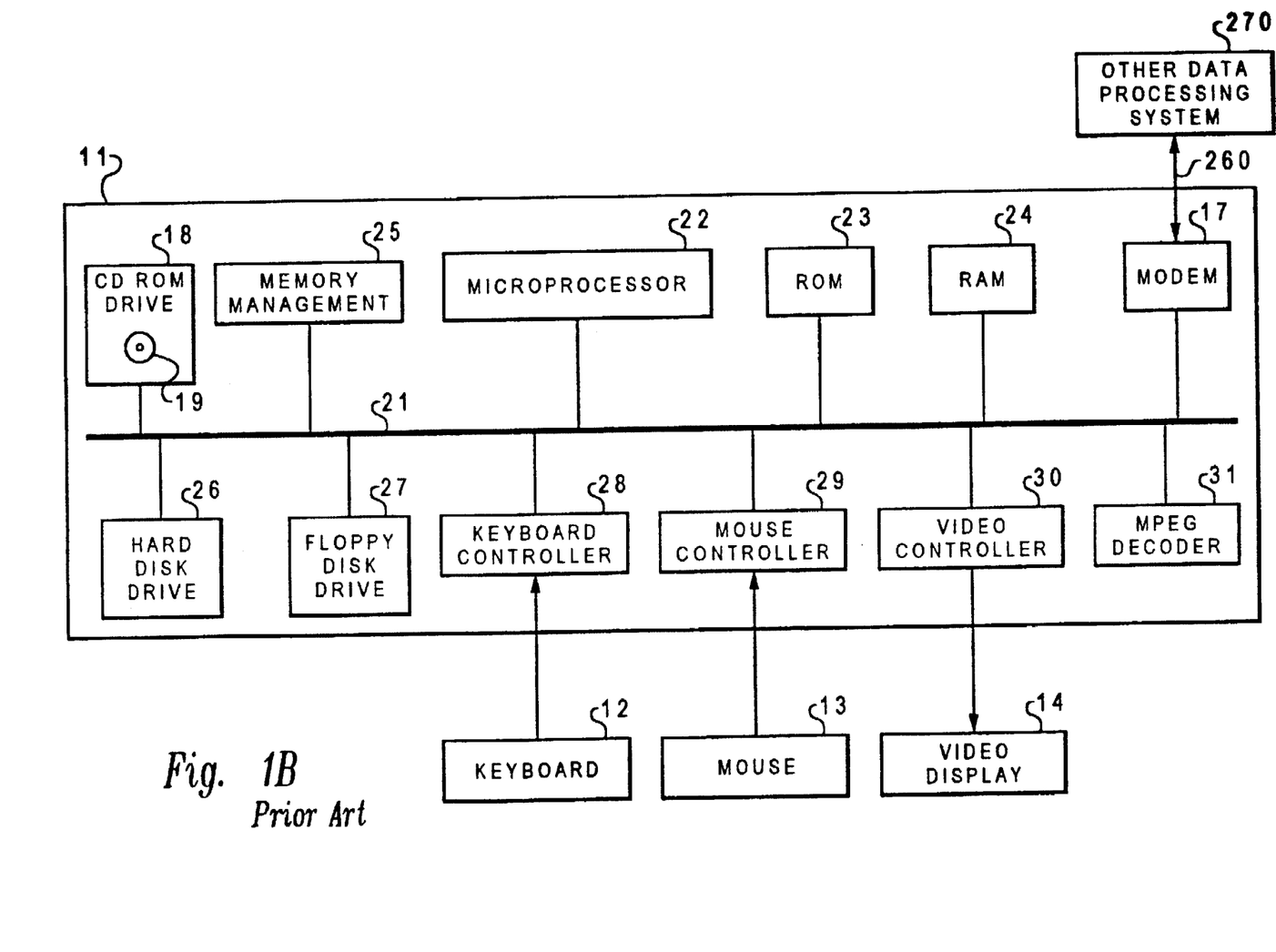
FIG. 1B is a block diagram of the components for the personal computer depicted in FIG. 1A.

Referring now to FIG. 1B, there is illustrated a block diagram of the components for personal computer 10 in FIG. 1A. Processor unit 11 includes system bus 21 to which various components are attached and by which communications among various components are accomplished. Microprocessor 22, connecting to system bus 21, is supported by read only memory (ROM) 23 and random access memory (RAM) 24, both of which are also connected to system bus 21. Microprocessor 22 in the International Business Machines Corporation's Aptiva™ computer series is one of the Intel® family of microprocessors; however, other microprocessors manufactured by Hewlett Packard, Inc., Sun Microsystems, Motorola, Inc., and others may be applicable also.

ROM 23 contains, among other codes, the Basic Input/Output System (BIOS) which controls certain basic hardware operations, such as interactions of hard disk drive 26 and floppy disk drive 27. RAM 24 is the main memory within which the operating system having the present invention incorporated and other application programs are loaded. A memory management device 25 is connected to system bus 21 for controlling all Direct Memory Access (DMA) operations such as paging data between RAM 24 and hard disk drive 26 or floppy disk drive 27.

As shown in FIGS. 1A and 1B, a CD ROM drive 18 having a compact disk 19 inserted inside is installed within processor unit 11. In addition, an MPEG decoder 31 is also installed within processor unit 11 for decoding MPEG data stored in a digital storage medium (DSM) such as compact disk 19. Further, a modem 17 may be utilized to communicate with other data processing systems 270 across communications line 260.

To complete the description of processor unit 11, there are three input/output (I/O) controllers, namely, keyboard controller 28, mouse controller 29 and video controller 30, all of which are connected to system bus 21. As their names imply, keyboard controller 28 provides the hardware interface for keyboard 12, mouse controller 29 provides the hardware interface for mouse 13, and video controller 30 provides the hardware interface for video display 14.

Figure 2:
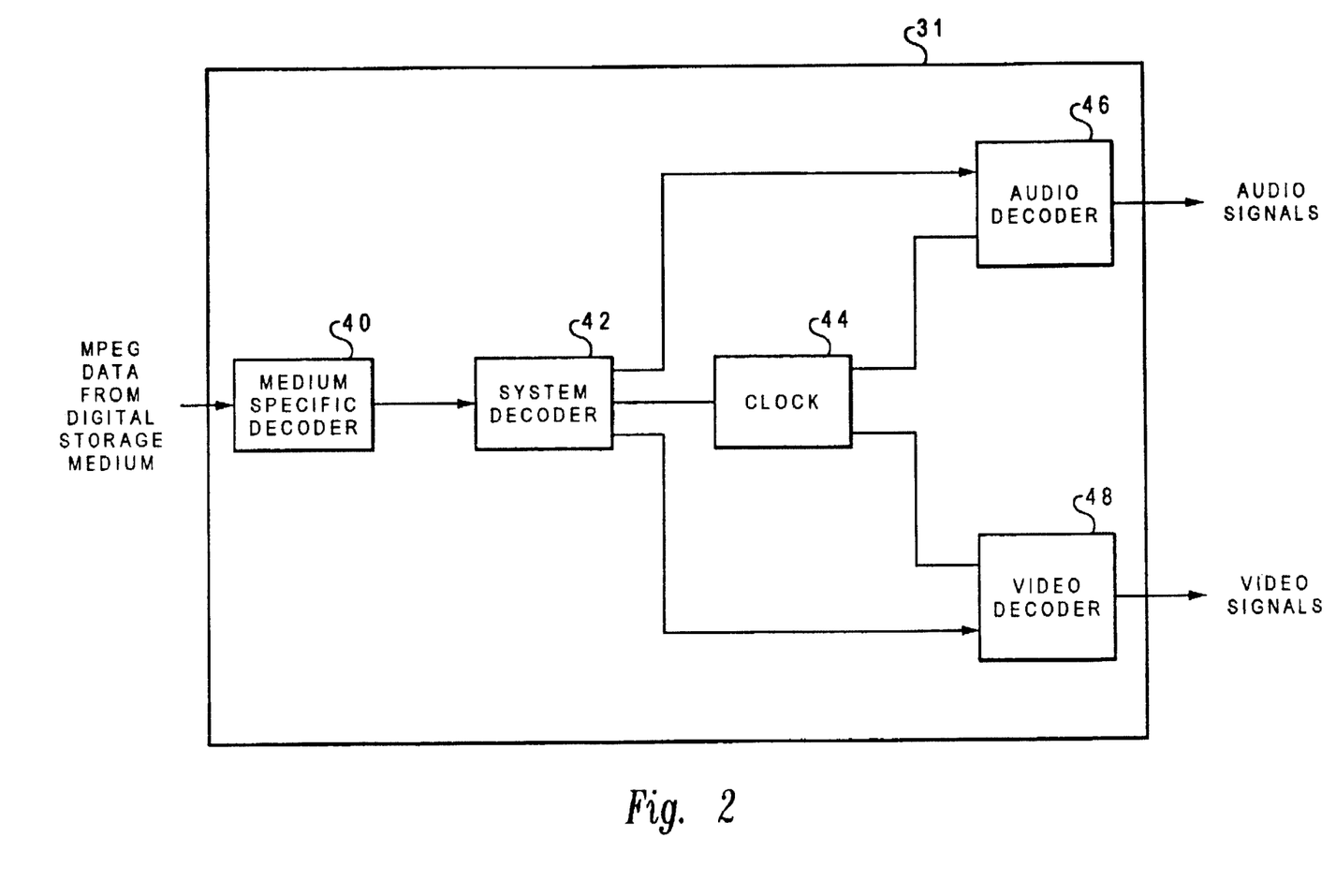
FIG. 2 is a block diagram of a typical MPEG decoder utilized by a preferred embodiment of the invention.

Referring now to FIG. 2, there is illustrated a block diagram of a typical MPEG decoder 31. MPEG decoder 31 comprises a medium specific decoder 40, a system decoder 42, an audio decoder 46 and a video decoder 48. System decoder 42, audio decoder 46 and video decoder 48 are all synchronized by clock 44. MPEG data from a digital storage medium is input to MPEG decoder 31 via medium specific decoder 40 which converts the MPEG data to an MPEG data stream specifically for system decoder 42. System decoder 42 then demultiplexes the MPEG data stream into two elementary streams for separately feeding to audio decoder 46 and video decoder 48, whose outputs are decoded audio signals and decoded video signals respectively.

Figure 3:
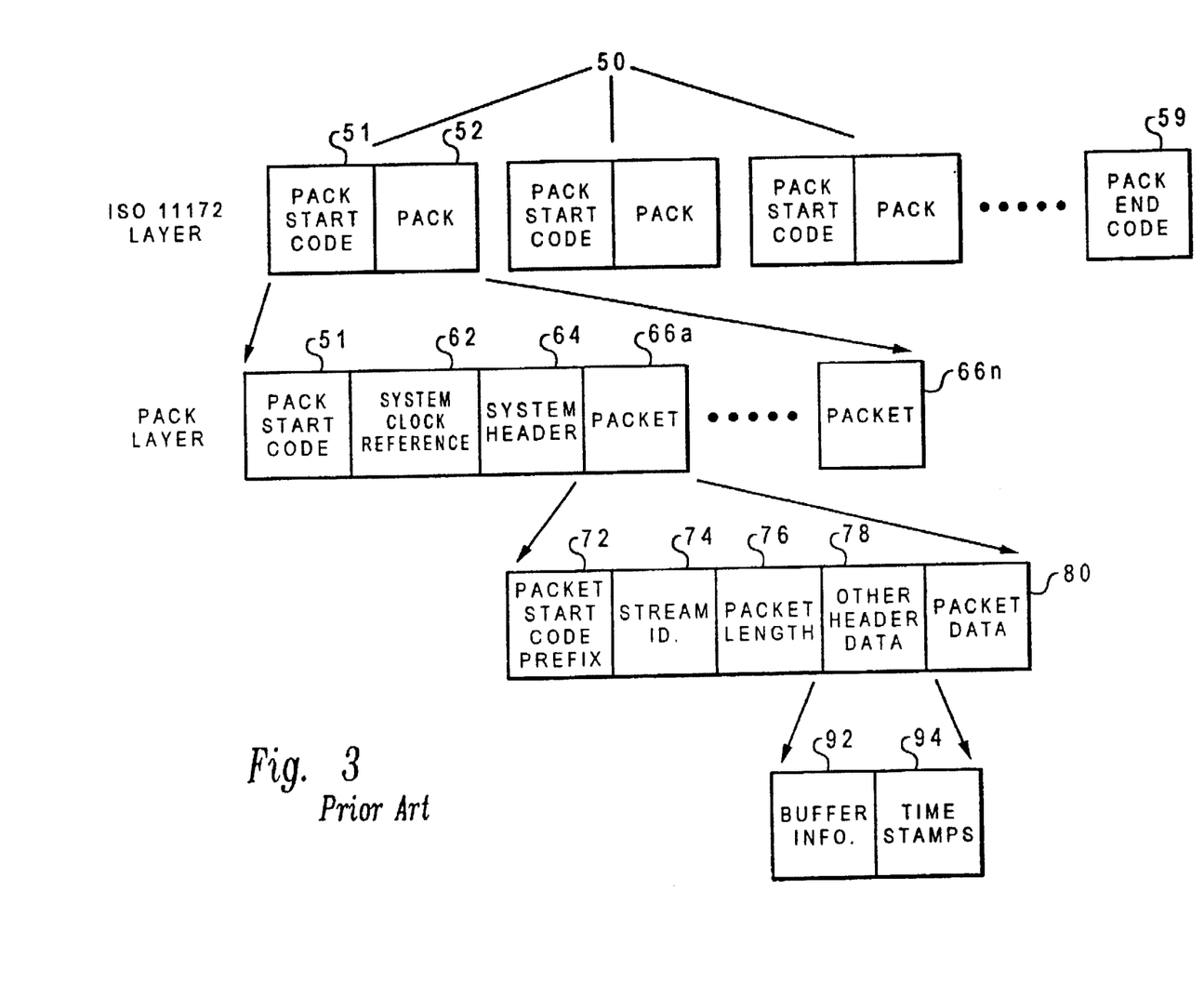
FIG. 3 is a block diagram of the ISO/IEC 11172 data-stream structure.

Referring now to FIG. 3, there is illustrated a block diagram of the ISO/IEC 11172 data-stream structure. The ISO 11172 data stream (or MPEG data stream) comprises a series of random access sub-stream 50, each having a pack start code 51 and a pack 52, and concludes with a pack end code 59. Within each pack 52, there are system clock reference (SCR) 62, system header 64, and a variable number of packets 66a, 66n. Pack start code 51 is 32 bits in length, and it contains information for identifying each pack 52. SCR 62 is a snapshot of a system clock from an encoder (not shown). Because any SCR utilized by the audio, video and associated ancillary data in a decoder must have approximately the same value, hence, in order to all SCR values in agreement, SCR 62 is inserted into the MPEG data stream on a cyclic basis by the encoder and are extracted by system decoder 42. In fact, four bytes of each eight-byte SCR 62 contain a time stamp encoded by the encoder during the encoding stage intended for such synchronization purpose.

Typically, system header 64 only appears in the first pack of any MPEG data-stream, and it is a data structure that carries information summarizing the system characteristics of the multiplexed MPEG data stream. System header 64 contains information such as an audio bound and a video bound; however, for the purpose of the present invention, the most important element is the frame rate (not shown) stored within the video bound of system header 64. The frame rate is constant throughout for each MPEG data stream. Finally, all data, both audio and video, are stored within packet data 80 of packets 66a, 66n. In general, several packets 66a, 66n constitutes one frame.

In addition to packet data 80, each of packets 66a, 66n also includes a packet start code prefix 72, a stream identification 74, a packet length 76, and some other header data 78. Certain buffer information 92 and time stamps 94 are stored within the field of other header data 78 in each of packets 66a, 66n. Time stamps 94 can be either a presentation time-stamp (PTS) only or a PTS and a decoding time-stamp (DTS) both. The PTS indicates the time that a presentation unit is presented in system decoder 42 while the DTS indicates the time that an access unit is decoded in system decoder 42. A presentation unit is a decoded video picture, ancillary data, or audio time sequence, and PTSs are samples of the encoder system clock that are associated with some audio, video, or associated ancillary data presentation units. Thus, PTS represents the time at which the video picture is to be displayed, the starting playback time for the audio time sequence, or the time that the associated ancillary data must be achieved. PTSs are also inserted into the data stream on a cyclic basis by the encoder and are then extracted by system decoder 42. The ISO 11172 data-stream structure is described in more detail in ISO/IEC 11172-1, 1993, which is incorporated herein by reference.

Figure 4:
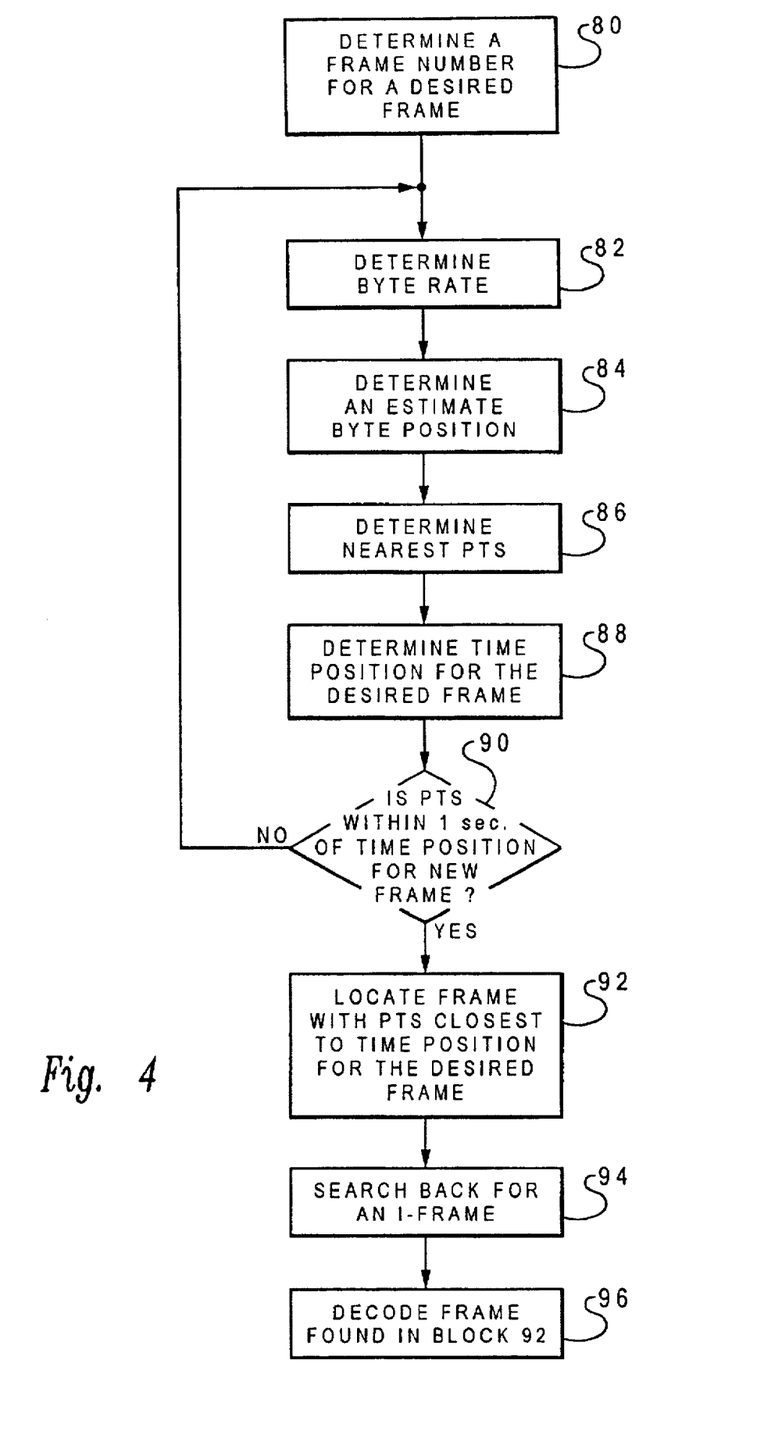
FIG. 4 is a high-level logic flow diagram of a method for locating a frame position in an MPEG data stream within a computer system, according to a preferred embodiment of the invention.

Referring now to FIG. 4, there is illustrated a high-level logic flow diagram of the method for locating a frame position in MPEG data streams within a computer system, according to a preferred embodiment of the invention. Starting at block 80, a frame number for a desired frame position, NewFramePos, may be determined from an input by a user or some other means. Then, at block 82, the number of bytes per frame, ByteRate, is determined by the following equation:

$$ByteRate = \frac{ByteOffset_{SCR2} - ByteOffset_{SCR1}}{SCR2 - SCR1} \times \frac{ClockFreq}{FrameRate}$$

where:

ByteOffset$_{SCR1}$=byte position of the first byte of last SCR from current byte position, w.r.t. to the beginning of the data stream ByteOffset$_{SCR2}$=byte position of the first byte of next SCR from current byte position, w.r.t. to the beginning of the data stream SCR1=last SCR value from the current byte position SCR2=next SCR value from the current byte position ClockFreq=90 KHz FrameRate=frames per second Typically, SCR 62 in each pack of data stream 50 is utilized to determine the byte arrival schedule at decoder 31 in order to accommodate the correct buffering in decoder 31. Because the values of SCR 62 are calculated based on the actual byte-rate during encoding of data stream 50, two consecutive SCR 62 values, SCR1 and SCR2, may be utilized to calculate the number of bytes per frame at any location within data stream 50. SCR1 is the value of a previous SCR from the current position in bytes, while SCR2 is the value of a next SCR from the current position in bytes. Further, ByteOffset$_{SCR1}$ is the byte position of a first byte of the previous SCR from the current position in bytes, while ByteOffset$_{SCR2}$ is the byte position of a first byte of the next SCR from the current position in bytes. As a preferred embodiment of the invention, ByteOffset$_{SCR1}$ may be obtained from a counter that keeps track of the byte count since the beginning of data stream 50, while ByteOffset$_{SCR2}$ may be obtained by moving forward from the current position to the next SCR. Clock frequency, ClockFreq, also from the encoder, is typically at 90 KHz as defined by the MPEG standard. The frame rate, FrameRate, may be extracted from the 5-bit video bound of system header 64.

At block 84, an estimate byte position for the desired frame, EstiBytePos, is determined by multiplying the difference between the frame number at the desired frame position, NewFramePos, and the frame number at the current position, CurrFramePos, to the number of bytes per frame, ByteRate (from block 82), and the product is then added to the byte position for the current frame, CurrByte-Pos. The steps described above can be expressed in equation form as follows:

$$EstiBytePos=(NewFramePos-CurrFramePos) \times ByteRate+CurrBytePos$$

where:

NewFramePos=frame number of desired frame position

CurrFramePos=frame number of current frame position

ByteRate=number of bytes per frame

CurrBytePos=current byte position

Next, at block 86, a search is made by parsing forward and backward for the PTS nearest to the estimate byte position for the desired frame, EstiBytePos, found at block 84. Then, at block 88, the time position of the desired frame, NewTimePos, is determined by dividing the frame number of the desired frame, NewFramePos, by the frame rate, FrameRate, as follows:

$$NewTimePos = \frac{NewFramePos}{FrameRate}$$

where:

NewFramePos=frame number of desired frame position

FrameRate=frames per second

Subsequently, at block 90, a determination is made as to whether the nearest PTS as determined at block 86 is within a specified proximity to the time position of the desired frame, NewTimePos, as determined at block 88. As a preferred embodiment of the invention, the specified proximity is about one second, and probably should not be more than two second. If the nearest PTS is not within the specified proximity to NewTimePos, then the process returns back to block 82 in order to determine a new ByteRate. Otherwise, if the nearest PTS is within the specified proximity to NewTimePos, then move forward or backward to locate a frame with a PTS that is closest to NewTimePos, at block 92. This frame position, at which the desired frame is located, is probably different from the selected frame position obtained at block 86. Finally, at block 94, a backward search for the nearest I-frame is performed. All the frames subsequent to the I-frame can then be decoded, at block 96, until the desired frame position found at block 92 is reached.

As has been described, the present invention provides an improved method for locating a frame position in an MPEG data stream within a computer system.

While the invention has been particularly shown and described with reference to a preferred embodiment, it will be understood by those skilled in the art that various changes in form and detail may be made therein without departing from the spirit and scope of the invention.

What is claimed is:

1. A method for efficiently locating a frame in an MPEG data stream within a computer system, said method comprising the steps of:

determining a frame number for a desired frame;

determining a byte-rate of said MPEG data stream;

determining an estimate byte position for said desired frame from said byte-rate of said MPEG data stream;

identifying a presentation time stamp which is nearest to said estimate byte position for said desired frame;

determining a time position of said desired frame;

determining whether said presentation time stamp is within a specified proximity to said time position of said desired frame;

in response to a determination that said presentation time stamp is not within said specified proximity to said time position of said desired frame, returning to said determining a byte-rate step; and in response to a determination that said presentation time stamp is within said specified proximity of said time position of said desired frame, searching for said desired frame within said specified proximity.

2. The method for efficiently locating a frame in an MPEG data stream within a computer system of claim 1, said determining a byte-rate step further comprises the step of:

dividing the product of a clock frequency and the difference between a byte position of a last system clock reference from a current frame and a byte position of a next system clock reference from said current frame by the product of a frame rate and the difference between a value of said last system clock reference from said current frame and a value of said next system clock reference from said current frame.

3. The method for efficiently locating a frame in an MPEG data stream within a computer system of claim 1, said determining an estimate byte position step further comprises the step of:

adding a byte position of a current frame to the product of said byte-rate and the difference between a frame number for said desired frame and a frame number for said current frame.

4. The method for efficiently locating a frame in an MPEG data stream within a computer system of claim 1, said determining a time position step further comprises the step of:

dividing a frame number for said desired frame by a frame rate.

5. The method for efficiently locating a frame in an MPEG data stream within a computer system of claim 1, said determining whether said presentation time stamp is within a specified proximity step further comprises the step of:

determining whether said presentation time stamp is within two second of said time position of said desired frame.

6. The method for efficiently locating a frame in an MPEG data stream within a computer system of claim 1, said method further comprises the steps of:

searching back for an I-frame; and decoding all frames subsequent to said I-frame until said desired frame is reached.

7. A computer system for efficiently locating a frame position in an MPEG data stream, said computer system comprising:

means for determining a frame number for a desired frame;

means for determining a byte-rate of said MPEG data stream;

means for determining an estimate byte position for said desired frame from said byte-rate of said MPEG data stream;

means for identifying a presentation time stamp which is nearest to said estimate byte position for said desired frame;

means for determining a time position of said desired frame;

means for determining whether said presentation time stamp is within a specified proximity to said time position of said desired frame;

means for determining another byte-rate, in response to a determination that said presentation time stamp is not within said specified proximity to said time position of said desired frame; and means for searching said desired frame within said specified proximity, in response to a determination that said presentation time stamp is within said specified proximity of said time position of said desired frame.

8. The system for efficiently locating a frame in an MPEG data stream of claim 7, said means for determining a byte-rate further comprises:

means for dividing the product of a clock frequency and the difference between a byte position of a last system clock reference from a current frame and a byte position of a next system clock reference from said current frame by the product of a frame rate and the difference between a value of said last system clock reference from said current frame and a value of said next system clock reference from said current frame.

9. The system for efficiently locating a frame in an MPEG data stream of claim 7, said means for determining an estimate byte position further comprises:

means for adding a byte position of a current frame to the product of said byte-rate and the difference between a frame number for said desired frame and a frame number for said current frame.

10. The system for efficiently locating a frame in an MPEG data stream of claim 7, said means for determining a time position further comprises:

means for dividing a frame number for said desired frame by a frame rate.

11. The system for efficiently locating a frame in an MPEG data stream of claim 7, said means for determining whether said presentation time stamp is within a specified proximity further comprises:

means for determining whether said presentation time stamp is within two second of said time position of said desired frame.

12. The system for efficiently locating a frame in an MPEG data stream of claim 7, said system further comprises:

means for searching back for an I-frame; and means decoding all frames subsequent to said I-frame until said desired frame is reached.

13. A computer program product residing in a computer usable medium for efficiently locating a frame position in an MPEG data stream within a computer system, said computer program product comprising:

computer program code means for determining a frame number for a desired frame;

computer program code means for determining a byte-rate of said MPEG data stream;

computer program code means for determining an estimate byte position for said desired frame from said byte-rate of said MPEG data stream;

computer program code means for identifying a presentation time stamp which is nearest to said estimate byte position for said desired frame;

computer program code means for determining a time position of said desired frame;

computer program code means for determining whether said presentation time stamp is within a specified proximity to said time position of said desired frame;

computer program code means for determining another byte-rate, in response to a determination that said presentation time stamp is not within said specified proximity to said time position of said desired frame; and computer program code means for searching for said desired frame within said specified proximity, in response to a determination that said presentation time stamp is within said specified proximity of said time position of said desired frame.

14. The computer program product for efficiently locating a frame in an MPEG data stream within a computer system of claim 13, said computer program code means for determining a byte-rate further comprises:

computer program code means for dividing the product of a clock frequency and the difference between a byte position of a last system clock reference from a current frame and a byte position of a next system clock reference from said current frame by the product of a frame rate and the difference between a value of said last system clock reference from said current frame and a value of said next system clock reference from said current frame.

15. The computer program product for efficiently locating a frame in an MPEG data stream within a computer system of claim 13, said computer program code means for determining an estimate byte position further comprises:

computer program code means for adding a byte position of a current frame to the product of said byte-rate and the difference between a frame number for said desired frame and a frame number for said current frame.

16. The computer program product for efficiently locating a frame in an MPEG data stream within a computer system of claim 13, said computer program code means for determining a time position step further comprises:

computer program code means for dividing a frame number for said desired frame by a frame rate.

17. The computer program product for efficiently locating a frame in an MPEG data stream within a computer system of claim 13, said computer program code means for determining whether said presentation time stamp is within a specified proximity further comprises:

computer program code means for determining whether said presentation time stamp is within two second of said time position of said desired frame.

18. The computer program product for efficiently locating a frame in an MPEG data stream within a computer system of claim 13, said computer program product further comprises:

computer program code means for searching back for an I-frame; and computer program code means for decoding all frames subsequent to said I-frame until said desired frame is reached.

\* \* \* \* \*